(12) United States Patent
Matsunaga et al.

(10) Patent No.: US 12,569,759 B2
(45) Date of Patent: Mar. 10, 2026

(54) INFORMATION PROCESSING APPARATUS, GAME VIDEO EDITING METHOD, AND METADATA SERVER

(71) Applicant: Sony Interactive Entertainment Inc., Tokyo (JP)

(72) Inventors: Kiyobumi Matsunaga, Tokyo (JP); Masaki Takase, Tokyo (JP); Masahiro Fujihara, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 321 days.

(21) Appl. No.: 18/005,078

(22) PCT Filed: Jul. 19, 2021

(86) PCT No.: PCT/JP2021/026978
§ 371 (c)(1),
(2) Date: Jan. 11, 2023

(87) PCT Pub. No.: WO2022/019270
PCT Pub. Date: Jan. 27, 2022

(65) Prior Publication Data
US 2023/0302355 A1      Sep. 28, 2023

(30) Foreign Application Priority Data

Jul. 22, 2020      (JP) ................................. 2020-125328

(51) Int. Cl.
*A63F 13/497* (2014.01)
*A63F 13/35* (2014.01)
(Continued)

(52) U.S. Cl.
CPC ............ *A63F 13/497* (2014.09); *A63F 13/35* (2014.09); *A63F 13/86* (2014.09); *G11B 27/031* (2013.01)

(58) Field of Classification Search
CPC ........ A63F 13/497; A63F 13/35; A63F 13/86; G11B 27/031; H04N 21/8549
See application file for complete search history.

(56) References Cited

U.S. PATENT DOCUMENTS 8,187,104 B2 * 5/2012 Pearce ................... A63F 13/45
463/43
8,515,253 B2 8/2013 Cottrell
(Continued)

FOREIGN PATENT DOCUMENTS

JP      2011072735 A      4/2011
JP      2011516103 A      5/2011
(Continued)

OTHER PUBLICATIONS

International Search Report for corresponding PCT Application No. PCT/JP2021/026978, 4 pages, dated Oct. 12, 2021.
(Continued)

*Primary Examiner* — Kevin Y Kim
(74) *Attorney, Agent, or Firm* — Kilpatrick Townsend & Stockton LLP

(57) ABSTRACT

When a preset event occurs during a game progress, game software outputs an event code indicating the event that has occurred. A recording apparatus records a game video generated by execution of the game software, in association with time information. An event information transmitting section transmits, to a management server, event information including the event code and the event occurrence time. A video information transmitting section transmits, to the management server, an image ID set for the game video in the recording apparatus and time information indicating the start time and the end time of the game video. An editing management section acquires, from the management server, event data that identifies the event that has occurred in the game video, and determines a scene to be edited. A video (Continued)

SET AUTOMATIC CREATION PERIOD OF HIGHLIGHT VIDEO

* VIDEO MADE BY EXTRACTING USER'S FAVORITE SCENE HAVING OCCURRED DURING DESIGNATED PERIOD WILL BE PRESENTED.

○ ONE WEEK
  ○ TWO WEEKS
  ● ONE MONTH
  ○ THREE MONTHS
  ○ HALF YEAR
  ○ ONE YEAR

DECIDE editing section performs editing processing on the game video, based on the scene determined by the editing management section.

19 Claims, 10 Drawing Sheets

(51) Int. Cl.
  *A63F 13/86*    (2014.01)
  *G11B 27/031*   (2006.01)

(56)      References Cited

U.S. PATENT DOCUMENTS

| | | | |
|---|---|---|---|
| 9,003,147 | B2 | 4/2015 | Sakai |
| 9,776,085 | B2 | 10/2017 | Shiraiwa |
| 10,034,032 | B2 | 7/2018 | Naoyuki |
| 10,071,315 | B2 | 9/2018 | Watari |
| 10,255,348 | B2 | 4/2019 | Sato |
| 10,335,679 | B2 | 7/2019 | Fukuda |
| 10,693,956 | B1 | 6/2020 | Green |
| 2009/0208181 | A1 | 8/2009 | Cottrell |
| 2010/0269144 | A1 | 10/2010 | Forsman |
| 2012/0005628 | A1 | 1/2012 | Isozu |
| 2013/0111512 | A1 | 5/2013 | Scellato |
| 2013/0159654 | A1 | 6/2013 | Sakai |
| 2014/0004959 | A1* | 1/2014 | Kahrs ..................... A63F 13/49 463/42 |
| 2014/0228112 | A1* | 8/2014 | Laakkonen ............ G11B 27/32 463/31 |
| 2014/0364206 | A1 | 12/2014 | Shiraiwa |
| 2015/0018094 | A1 | 1/2015 | Watari |
| 2015/0262617 | A1* | 9/2015 | Jaime ....................... H04N 5/77 386/241 |
| 2017/0105029 | A1 | 4/2017 | Kunugida |
| 2017/0154097 | A1 | 6/2017 | Sato |
| 2017/0182415 | A1 | 6/2017 | Fukuda |
| 2018/0253765 | A1 | 9/2018 | Avedissian |
| 2019/0351335 | A1 | 11/2019 | Yong |

FOREIGN PATENT DOCUMENTS

| | | | |
|---|---|---|---|
| JP | 2013123537 | A | 6/2013 |
| JP | 2015013102 | A | 1/2015 |
| JP | 2015016104 | B1 | 1/2015 |
| JP | 2015198404 | A | 11/2015 |
| JP | 6083546 | B1 | 2/2017 |
| JP | 2018198089 | A | 12/2018 |
| JP | 2019057289 | A | 4/2019 |
| JP | 2020108074 | A | 7/2020 |
| WO | 2016067734 | A1 | 5/2016 |

OTHER PUBLICATIONS

International Search Report for related PCT Application No. PCT/JP2021/026977, 4 pages, dated Aug. 31, 2021.
International Search Report for related PCT Application No. PCT/JP2021/026979, 4 pages, dated Oct. 19, 2021.
Extended European Search Report for related EP Application No. 21847182.9, 8 pages, dated Apr. 18, 2024.

* cited by examiner

F I G . 1
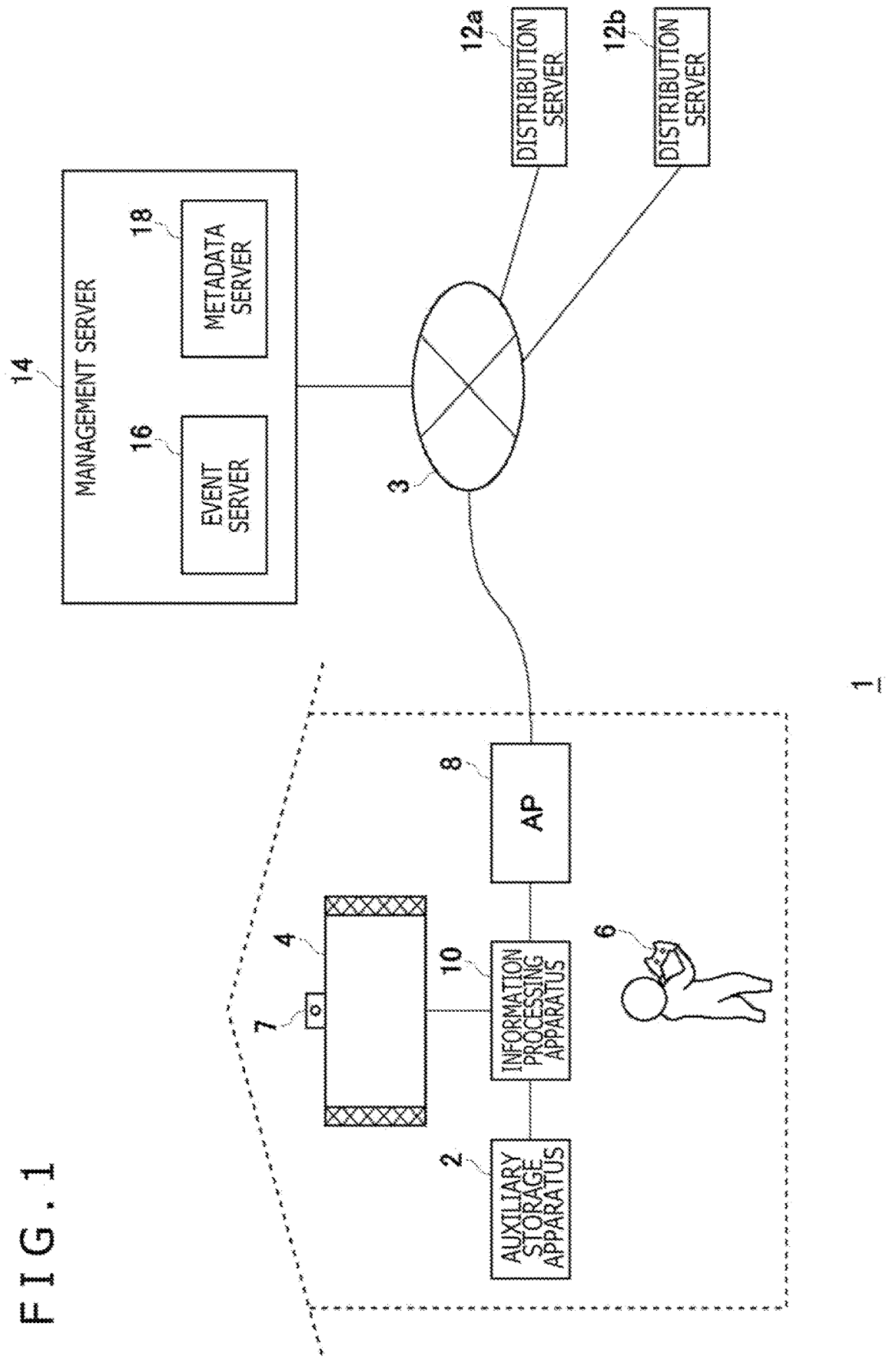

F I G . 2
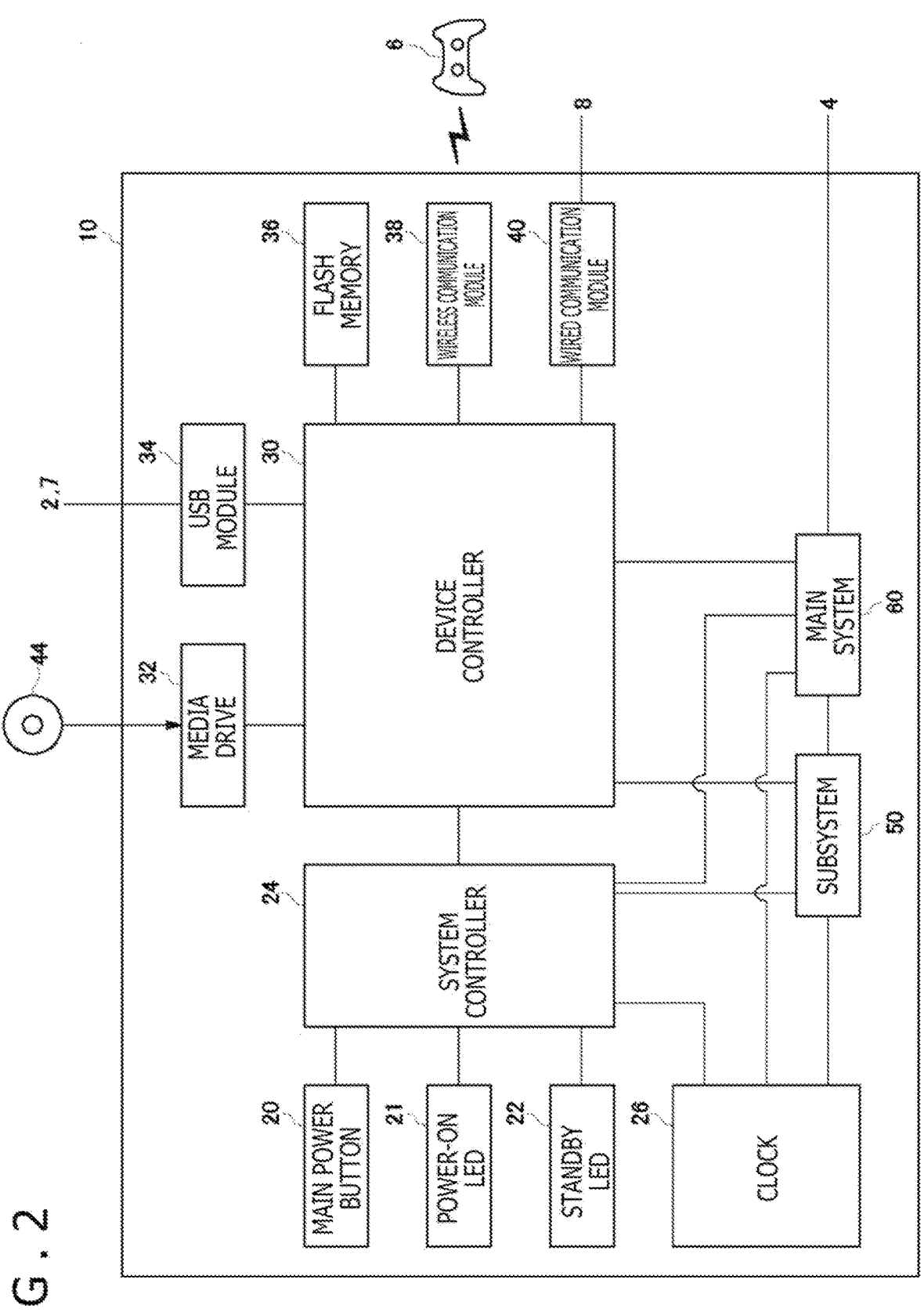

10

4

F I G . 6
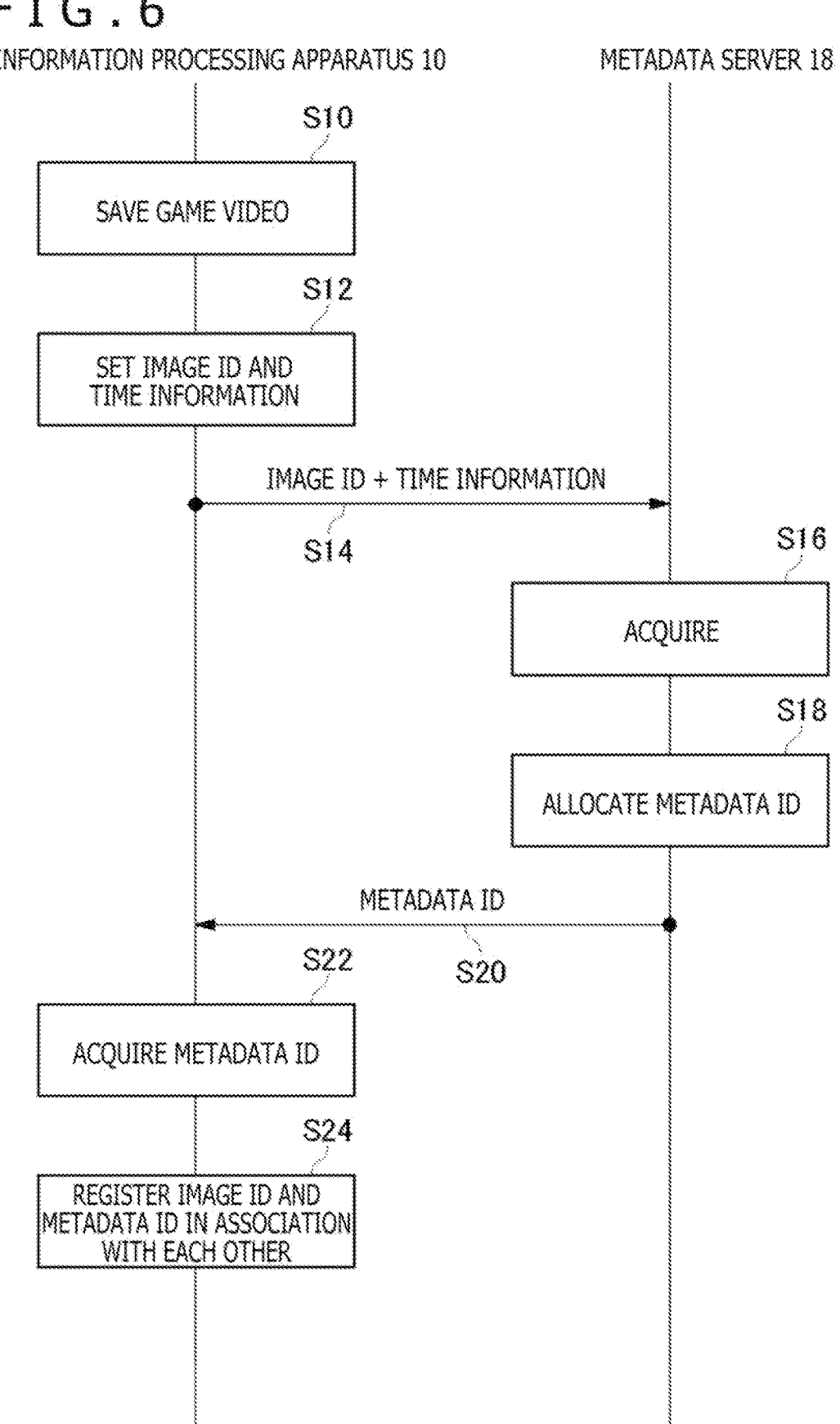

F I G . 8

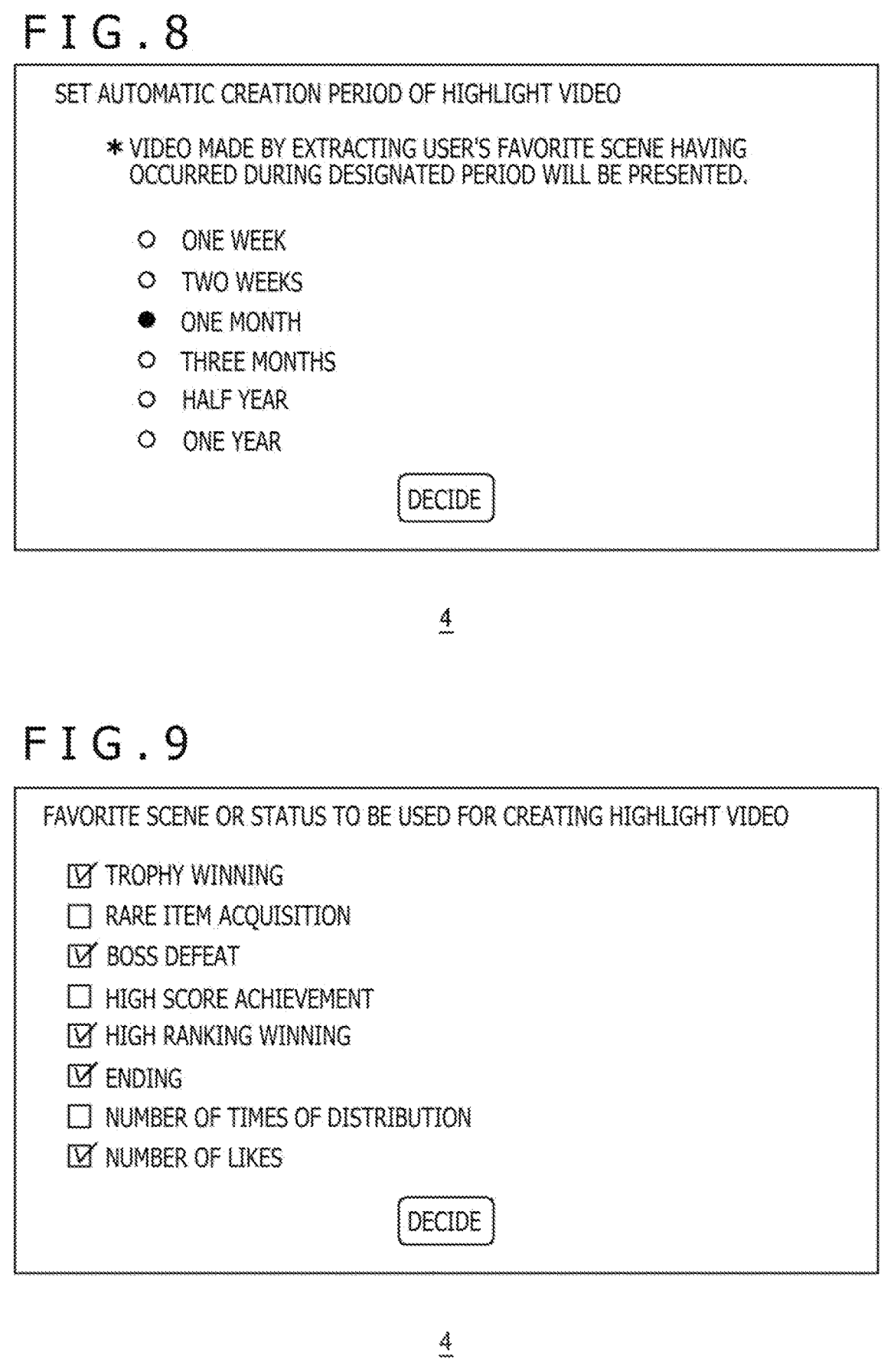

SET AUTOMATIC CREATION PERIOD OF HIGHLIGHT VIDEO

＊ VIDEO MADE BY EXTRACTING USER'S FAVORITE SCENE HAVING
OCCURRED DURING DESIGNATED PERIOD WILL BE PRESENTED.

○   ONE WEEK
○   TWO WEEKS
●   ONE MONTH
○   THREE MONTHS
○   HALF YEAR
○   ONE YEAR

DECIDE

4

F I G . 9

FAVORITE SCENE OR STATUS TO BE USED FOR CREATING HIGHLIGHT VIDEO

☑ TROPHY WINNING
☐ RARE ITEM ACQUISITION
☑ BOSS DEFEAT
☐ HIGH SCORE ACHIEVEMENT
☑ HIGH RANKING WINNING
☑ ENDING
☐ NUMBER OF TIMES OF DISTRIBUTION
☑ NUMBER OF LIKES

DECIDE

| ITEM | DETAILS | EVALUATION VALUE |
|---|---|---|
| TROPHY WINNING | PLATINUM | 100 |
| | GOLD | 60 |
| | SILVER | 30 |
| | BRONZE | 10 |
| ITEM ACQUISITION | ULTRA-RARE | 80 |
| | SUPER-RARE | 50 |
| | NORMAL-RARE | 10 |
| BOSS DEFEAT | BACKSTAGE BOSS | 90 |
| | FINAL BOSS | 70 |
| | MIDDLE BOSS | 30 |
| | SMALL BOSS | 10 |
| SCORE ACHIEVEMENT | ULTRA-HIGH SCORE | 70 |
| | SUPER-HIGH SCORE | 40 |
| RANKING WINNING | WORLD RANKING TOP 100 | 100 |
| | WORLD RANKING TOP 500 | 70 |
| | WORLD RANKING TOP 1000 | 40 |
| NUMBER OF TIMES OF DISTRIBUTION | MORE THAN 1,000,000 | 80 |
| | MORE THAN 500,000 | 50 |
| | MORE THAN 100,000 | 20 |
| NUMBER OF LIKES | MORE THAN 1,000,000 | 80 |
| | MORE THAN 500,000 | 50 |
| | MORE THAN 100,000 | 20 |
| ENDING SCENE | | 50 |

INFORMATION PROCESSING APPARATUS, GAME VIDEO EDITING METHOD, AND METADATA SERVER

TECHNICAL FIELD

The present invention relates to a technique for editing game videos.

BACKGROUND ART

PTL 1 discloses an information processing apparatus that includes a ring buffer that executes overwriting and records a game image and an editing processing section that reads, from the ring buffer, game images recorded for a predetermined time period starting from a time at which an event has occurred and that extracts the game images as content data of the event. Further, PTL 1 discloses an editing server that receives game images and an event code from an information processing apparatus and edits the game images.

CITATION LIST

Patent Literature

[PTL 1] JP 2015-198404A

SUMMARY

Technical Problems

As illustrated in PTL 1, in a case where automatic editing processing on the game images is performed completely within the information processing apparatus, there is a possibility that a processing load of the information processing apparatus becomes excessive, and on the other hand, in a case of entrusting the automatic editing processing to an editing server, the game images must be sent to the editing server. Considering large data volume of high-resolution game images, real-time transmission of game images for the purpose of video editing is not preferable from a viewpoint of a communication load. Therefore, construction of a mechanism for performing automatic editing processing while reducing the processing load of the information processing apparatus is desired.

Therefore, an object of the present disclosure is to achieve a mechanism for automatically editing game videos.

Solution to Problems

In order to solve the above problems, an information processing apparatus according to one aspect of the present disclosure is an information processing apparatus that executes game software which, when a preset event occurs while a game is in progress, outputs an event code indicating the event that has occurred, the information processing apparatus being connected to a management server, the information processing apparatus including a recording apparatus that records, in association with time information, a game video generated by execution of the game software, an event information transmitting section that transmits, to the management server, event information including the event code and a time at which the event has occurred, a video information transmitting section that transmits, to the management server, an image ID (Identification) set for the game video in the recording apparatus and time information indicating a start time and an end time of the game video, an editing management section that acquires, from the management server, event data that identifies the event that has occurred in the game video and determines a scene to be edited, and a video editing section that performs editing processing on the game video on the basis of the scene determined by the editing management section Another aspect of the present disclosure is a game video editing method. This method includes a step of recording, in association with time information, the game video generated by execution of game software, a step of transmitting, to a management server, event information including an event code output by the game software and a time at which an event has occurred, a step of transmitting, to the management server, an image identification set for the recorded game video and time information indicating a start time and an end time of the game video, a step of acquiring, from the management server, event data that identifies the event that has occurred in the game video, a step of determining a scene to be edited, on the basis of the event data, and a step of performing editing processing on the game video on the basis of the determined scene.

Yet another aspect of this disclosure is a metadata server. This metadata server is a metadata server connected to an information processing apparatus operated by a user, and includes an information acquiring section that acquires, from the information processing apparatus, an image identification of a game video recorded in the information processing apparatus and time information indicating a start time and an end time of the game video, an identification allocating section that allocates a metadata identification to a combination of the image identification and the time information, an identification transmitting section that transmits the metadata identification to the information processing apparatus, a request receiving section that receives, from the information processing apparatus, a request to acquire event data, the request including the metadata identification, a request transmitting section that acquires time information on the basis of the metadata identification included in the acquisition request and transmits a request to acquire event data to the event server, the request including the time information, a data acquiring section that acquires event data from the event server, and a data transmitting section that transmits the image identification and the event data to the information processing apparatus.

It should be noted that any combination of the above-described components and matters obtained by converting expressions of the present disclosure between methods, apparatuses, systems, recording media, computer programs, etc., are also effective as aspects of the present disclosure.

BRIEF DESCRIPTION OF DRAWINGS

FIG. 1 is a diagram illustrating an information processing system according to an embodiment.

FIG. 2 is a diagram illustrating a hardware configuration of an information processing apparatus.

FIG. 6 is a sequence diagram of processing for transmitting metadata of a game video.

FIG. 8 is a diagram illustrating an example of a screen for setting a creation period of a highlight video.

FIG. 9 is a diagram illustrating an example of a screen for registering a user's favorite scene or status.

FIG. 11 is a diagram illustrating an example of an evaluation value table.

DESCRIPTION OF EMBODIMENT

Figure 3:
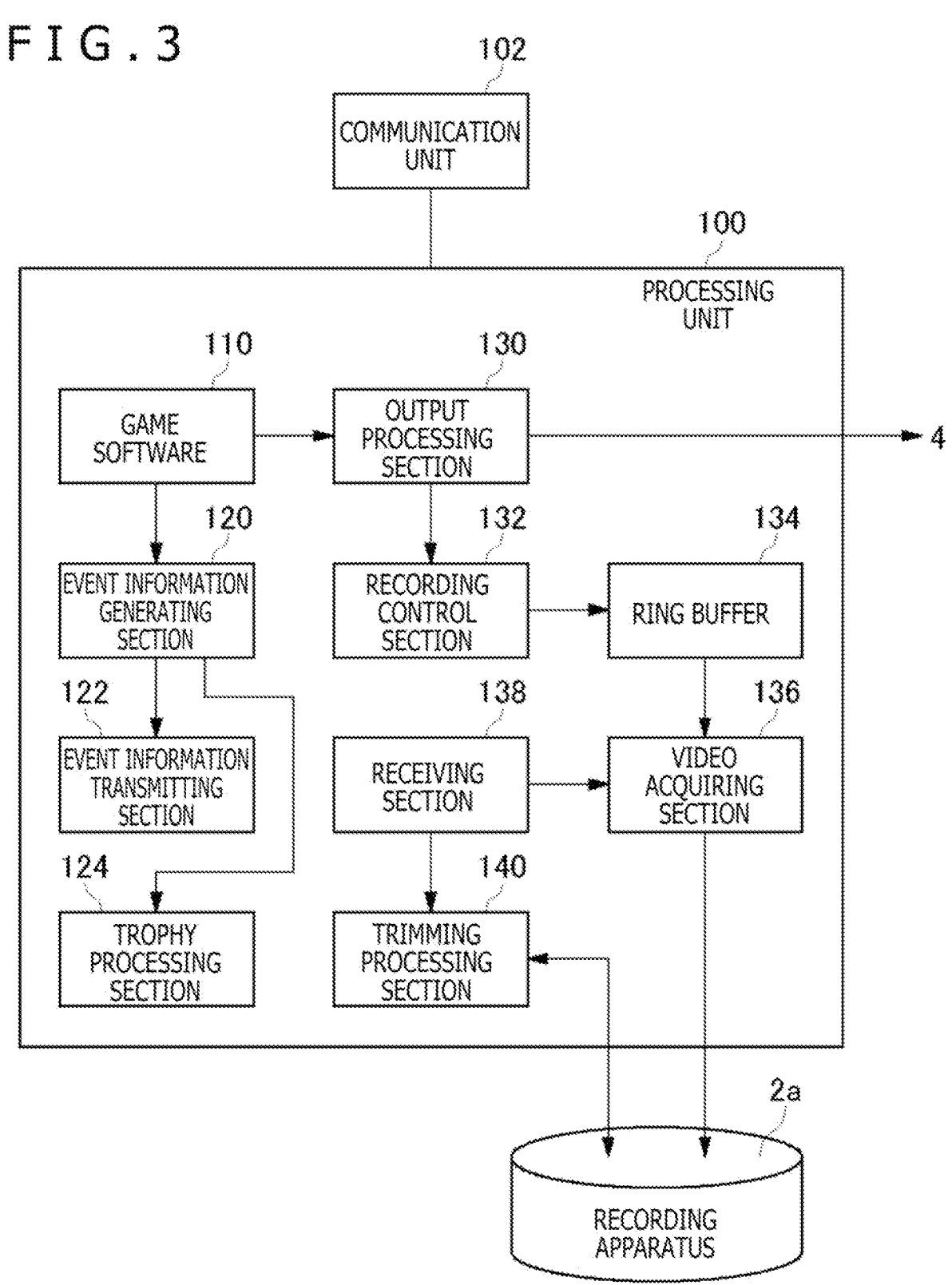
FIG. 3 is a diagram illustrating functional blocks of the information processing apparatus.

In an information processing system according to an embodiment, an information processing apparatus executes game software and records, in a recording apparatus, a video (game video) obtained by capturing game images generated by the game software. The information processing apparatus periodically and automatically edits a plurality of game videos and joins the videos together to generate a highlight video in which highlight scenes are summarized.

FIG. 1 illustrates an information processing system 1 according to an embodiment of the present disclosure. The information processing system 1 includes an information processing apparatus 10 which is a user terminal apparatus, distribution servers 12a and 12b for distributing content images uploaded by users (hereinafter referred to as a "distribution server 12" unless otherwise especially distinguished), and a management server 14. The management server 14 has an event server 16 and a metadata server 18. The event server 16 and the metadata server 18 may be configured as separate server apparatuses, but may also be achieved as separate functions in one management server 14. The information processing system 1 according to the embodiment is configured as a video editing system.

An access point (hereinafter referred to as an "AP") 8 has functions of a wireless access point and a router, and the information processing apparatus 10 is connected to the AP 8 wirelessly or by wire to communicably connected to the distribution servers 12, the event server 16, and the metadata server 18 on a network 3.

The information processing apparatus 10 is connected, wirelessly or by wire, to an input apparatus 6 operated by a user, and the input apparatus 6 outputs, to the information processing apparatus 10, information regarding a user's operation. When receiving the operation information from the input apparatus 6, the information processing apparatus 10 reflects the operation information in the processing of system software and the game software, and causes an output apparatus 4 to output a processing result. In the information processing system 1, the information processing apparatus 10 may be a game apparatus (game console) that executes a game, and the input apparatus 6 may be equipment that supplies user's operation information to the information processing apparatus 10, such as a game controller. Incidentally, the input apparatus 6 may be an input interface such as a keyboard or a mouse.

An auxiliary storage apparatus 2 is a large-capacity recording apparatus such as an HDD (Hard Disk Drive) or an SSD (Solid State Drive), may be a built-in recording apparatus, and also may be an external recording apparatus connected to the information processing apparatus 10 by a USB (Universal Serial Bus), etc. The output apparatus 4 may be a television having a display for outputting images and a speaker for outputting sounds. The output apparatus 4 may be connected to the information processing apparatus 10 with a cable, or may be wirelessly connected to the information processing apparatus 10.

A camera 7 as an image capturing apparatus is provided near the output apparatus 4 and captures an image of a space around the output apparatus 4. Although FIG. 1 illustrates an example in which the camera 7 is attached to the top of the output apparatus 4, the camera 7 may be placed on the side or the bottom of the output apparatus 4 and, in any case, is placed in a position to be capable of capturing the image of the user who is present in front of the output apparatus 4. The camera 7 may be a stereo camera.

The distribution server 12 provides an image sharing service for distributing content images uploaded from the information processing apparatus 10. The distribution server 12 performs on-demand distribution of the accumulated content images in response to requests from viewing users. Although the two distribution servers 12a and 12b are illustrated in FIG. 1, it is sufficient if the number of distribution servers 12 in the information processing system 1 is one or more.

The distribution server 12 manages distribution result data as metadata for each content image to be distributed. The distribution result data includes various kinds of performance data and evaluation data regarding distribution, and may include, for example, the total number of distributions, the number of distributions in the last week, the number of evaluations from viewing users, comments from viewing users, and the like. The distribution server 12 utilizes the distribution result data of each content image to create a popularity ranking of the content image and enhance the attractiveness of the image-sharing site.

When a preset event occurs during the progress of a game, a game program executed by the information processing apparatus 10 outputs an event code indicating the event that has occurred. The information processing apparatus 10 outputs event information including at least an event code and an event occurrence time to the event server 16. The event server 16 receives the event information transmitted from the information processing apparatus 10, associates the event information with a user's account ID, and accumulates the event information.

In response to a request from the information processing apparatus 10, the metadata server 18 acquires event data of a game video from the event server 16 and acquires distribution result data of the game video from the distribution server 12. The metadata server 18 transmits the acquired event data and distribution result data to the information processing apparatus 10 as metadata of the game video. Incidentally, for a game video that has not been uploaded to the distribution server 12, the metadata server 18 transmits only event data to the information processing apparatus 10 as metadata of the game video.

FIG. 2 illustrates a hardware configuration of the information processing apparatus 10. The information processing apparatus 10 includes a main power button 20, a power-ON LED (Light Emitting Diode) 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a main CPU (Central Processing Unit), a memory that is a main storage apparatus, a memory controller, a GPU (Graphics Processing Unit), and the like. The GPU is mainly used for arithmetic processing of game programs. The main CPU has a function of activating the system software and executing, under the environment provided by the system software, the game program installed in the auxiliary storage apparatus 2. The subsystem 50 includes a sub-CPU, a memory that is a main storage apparatus, a memory controller, and the like, and does not include a GPU.

While the main CPU has a function of executing game programs installed in the auxiliary storage apparatus 2 or a ROM (Read Only Memory) medium 44, the sub-CPU does not have such a function. However, the sub-CPU has a function of accessing the auxiliary storage apparatus 2 and a function of transmitting/receiving data to/from the management server 14. The sub-CPU is configured to have only such limited processing functions, and therefore can operate with lower power consumption than the main CPU. These functions of the sub-CPU are executed when the main CPU is in the standby state.

The main power button 20 is an input unit for inputting an operation from the user, is provided on the front surface of the housing of the information processing apparatus 10, and is operated to turn on or off the power supply to the main system 60 of the information processing apparatus 10. The power-ON LED 21 lights up when the main power button 20 is turned on, and the standby LED 22 lights up when the main power button 20 is turned off. The system controller 24 detects pressing of the main power button 20 by the user.

The clock 26 is a real-time clock, and generates current date-and-time information, and then supplies the current date-and-time information to the system controller 24, the subsystem 50, and the main system 60.

The device controller 30 is configured as an LSI (Large-Scale Integrated Circuit) that exchanges information between devices, like a south bridge. As illustrated in FIG. 2, devices such as the system controller 24, the media drive 32, the USB module 34, the flash memory 36, the wireless communication module 38, the wired communication module 40, the subsystem 50, and the main system 60 are connected to the device controller 30. The device controller 30 absorbs differences in electrical characteristics and data transfer speeds of the devices, and controls the timing of data transfer.

The media drive 32 is a drive apparatus that is provided with and drives the ROM medium 44 that records application software of games, etc., and license information, and reads programs, data, and the like from the ROM medium 44. The ROM medium 44 is a read-only recording medium such as an optical disk, a magneto-optical disk, or a Blu-ray disk.

The USB module 34 is a module that connects to external equipment with a USB cable. The USB module 34 may be connected to the auxiliary storage apparatus 2 and the camera 7 with USB cables. The flash memory 36 is an auxiliary storage apparatus that constitutes internal storage. The wireless communication module 38 wirelessly communicates with the input apparatus 6, for example, by using a communication protocol such as the Bluetooth (registered trademark) protocol or the IEEE802.11 protocol. The wired communication module 40 performs wired communication with external equipment and connects to the network 3 via the AP 8, for example.

The information processing apparatus 10 according to the embodiment has a function of recording a video of the game played by the user in the auxiliary storage apparatus 2 and a function of automatically editing the game video by acquiring metadata of the recorded game video from the management server 14. Hereinafter, the game video recording function will be described mainly referring to FIG. 3, and the game video editing function will be described mainly referring to FIG. 5. Elements described as functional blocks that perform various processes of the information processing apparatus 10 in FIGS. 3 and 5 can include circuit blocks, memories, and other LSI circuits in terms of hardware, and are implemented by a program or the like loaded in a memory in terms of software. Therefore, those skilled in the art will understand that these functional blocks can be achieved in various forms by hardware only, software only, or a combination thereof, and are not limited to either one.

FIG. 3 illustrates functional blocks that mainly implement the game video recording function of the information processing apparatus 10. The information processing apparatus 10 includes a processing unit 100 and a communication unit 102. The processing unit 100 includes game software 110, an event information generating section 120, an event information transmitting section 122, a trophy processing section 124, an output processing section 130, a recording control section 132, a ring buffer 134, a video acquiring section 136, a receiving section 138, and a trimming processing section 140. The receiving section 138 receives information regarding an operation on the input apparatus 6 from the user. A recording apparatus 2a may be a partial recording area of the auxiliary storage apparatus 2.

The game software 110 includes at least a game program, image data, and sound data. The game program receives information regarding an operation on the input apparatus 6 by the user and performs arithmetic processing to move a player character in a virtual space. The output processing section 130 generates image data and sound data of the game by the game software 110 being executed, and causes the output apparatus 4 to output the data. The output processing section 130 may include a GPU that executes rendering processing and the like.

In the information processing apparatus 10 according to the embodiment, the output processing section 130 generates image data and sound data of the game to cause the output apparatus 4 to output the data, and supplies the data to the recording control section 132 as well. Hereinafter, game image data and sound data will collectively be referred to as a "game video" or "game video data." The information processing apparatus 10 has a function of background-recording of the game video generated by the output processing section 130, and the recording control section 132 records the game video data in the ring buffer 134.

The ring buffer 134 is configured by a start address and an end address of a recording area of the auxiliary storage apparatus 2 being set. This ring buffer area may be set in advance before shipment of the information processing apparatus 10. The recording control section 132 records the game video data output from the output processing section 130 in the ring buffer 134 together with time information (time stamp).

The recording control section 132 records the game video data in the ring buffer 134 in predetermined order of addresses from the start address and, when having recorded up to the end address, returns to the start address to execute overwriting and recording, and repeats this operation. For example, the ring buffer 134 is set to record 60 minutes of game video, and the recorded game video is time-stamped. By performing background-recording on the game video in the ring buffer 134, the user can cut out and edit a favorite scene from the play video recorded up to 60 minutes before, and save the edited scene in the recording apparatus 2a. The user may upload the saved game video to the distribution server 12.

When a preset event occurs during the progress of the game, the game program outputs an event code indicating the event that has occurred. The event information generating section 120 acquires an event code from the game software 110 and generates event information in which time information (time stamp) indicating the time at which the event has occurred is added to the event code.

A game developer may arrange various events in the game. An event code is allocated to each event, and the game program may add game data indicating the state of the game at the time of the event occurrence to the event code indicating the event that has occurred, and output the event code. Here, the game data includes peripheral information such as information regarding the place where the event occurs, opponents, objects, and the like. For example, when a battle with an enemy boss starts, the game program may add game data indicating the location of the battle and the character ID of the enemy boss to the event code indicating the start of the battle, and output the event code.

When acquiring the event code and the game data, the event information generating section 120 adds thereto time information indicating the time at which the event has occurred, and generates event information. The event information generating section 120 supplies the generated event information to the event information transmitting section 122 and the trophy processing section 124.

When the user defeats the enemy boss, the game program outputs an event code indicating that the enemy boss has been defeated. At this time, the game program adds game data indicating the battle location and a character ID of the enemy boss to the event code and outputs the event code. The event information generating section 120 generates event information by adding time information indicating the time of the event occurrence to the event code and game data.

When the user acquires a game item, the game program outputs an event code indicating that the item has been acquired. At this time, the game program adds game data indicating the place of acquisition to the event code and outputs the event code. The event information generating section 120 generates event information by adding time information indicating the time of the event occurrence to the event code and game data. As described above, the game developer may define various events and incorporate the events into the game.

In addition, various missions are set in the game for the purpose of increasing the user's motivation to play the game, and when the user clears the mission, the user may be given a virtual award (trophy) corresponding to the mission. A plurality of trophies are prepared in the game according to the difficulty of the mission, and trophies of bronze, silver, gold, and platinum may be prepared in ascending order of difficulty.

The conditions for unlocking trophies (i.e., the conditions under which a user earns trophies by completing missions) may be associated with specific events. For example, in a case where a mission of "defeating a small boss" for a bronze trophy is set, the player is awarded a bronze trophy when the player defeats the small boss. Also, in a case where a mission of "defeating a middle boss" for a silver trophy is set, the silver trophy will be awarded when the player defeats the middle boss, and in a case where a mission of "defeating a final boss" for a gold trophy is set, the gold trophy will be awarded when the player defeats the final boss. Further, in a case where a mission of defeating a "backstage boss" for a platinum trophy is set, the player may be awarded a platinum trophy by defeating the backstage boss.

The trophy processing section 124 holds a correspondence relation between event codes and trophy unlock conditions. When event information is provided from the event information generating section 120, the trophy processing section 124 refers to the correspondence relation and performs processing for determining whether the trophy unlock condition is satisfied, on the basis of the event information. When determining that the unlocking condition is satisfied, the trophy processing section 124 records the unlocked trophy information together with the time information (time stamp) in the recording apparatus 2a. The unlocked trophy information may be sent to the management server 14.

The event information transmitting section 122 transmits the event information supplied from the event information generating section 120, from the communication unit 102 to the event server 16. Therefore, the event server 16 collects all event information regarding events that have occurred during the game play. The event information transmitting section 122 may transmit the event information each time the event information is supplied, or may collectively and periodically transmit the event information.

During execution of the game, the receiving section 138 receives an instruction regarding recording from the user. When the user operates a predetermined button on the input apparatus 6, the receiving section 138 receives the operation as an instruction for recording, and the video acquiring section 136 saves, in the recording apparatus 2a, the game video (video clip) having a length of up to 60 minutes recorded in the ring buffer 134. The duration of the video clip to be recorded may be preset by the user, with the upper limit being 60 minutes. Note that, during the game play, the user operates the input apparatus 6 to set the start point of the game video to be saved, and after the desired game scene ends, the user operates the input apparatus 6 to set the end point of the saving, so that the video acquiring section 136 may save, in the recording apparatus 2a, the game video specified by the start point and the end point. The video acquiring section 136 sets an image ID for identifying the game video, when saving the game video in the recording apparatus 2a. An image ID for uniquely identifying the video is always set to the game video saved in the recording apparatus 2a. In addition, the video acquiring section 136 sets time information indicating the start time and the end time of the game video as metadata of the game video and records the time information in the recording apparatus 2a. Therefore, in the recording apparatus 2a, the game video is saved in association with the image ID, the start time, and the end time.

After finishing the game, the user can edit the game video recorded in the recording apparatus 2a. For example, the user may operate the input apparatus 6 to set the start point and the end point of a scene that the user wants to save from the 60-minute game video recorded in the recording apparatus 2a.

Figure 4:
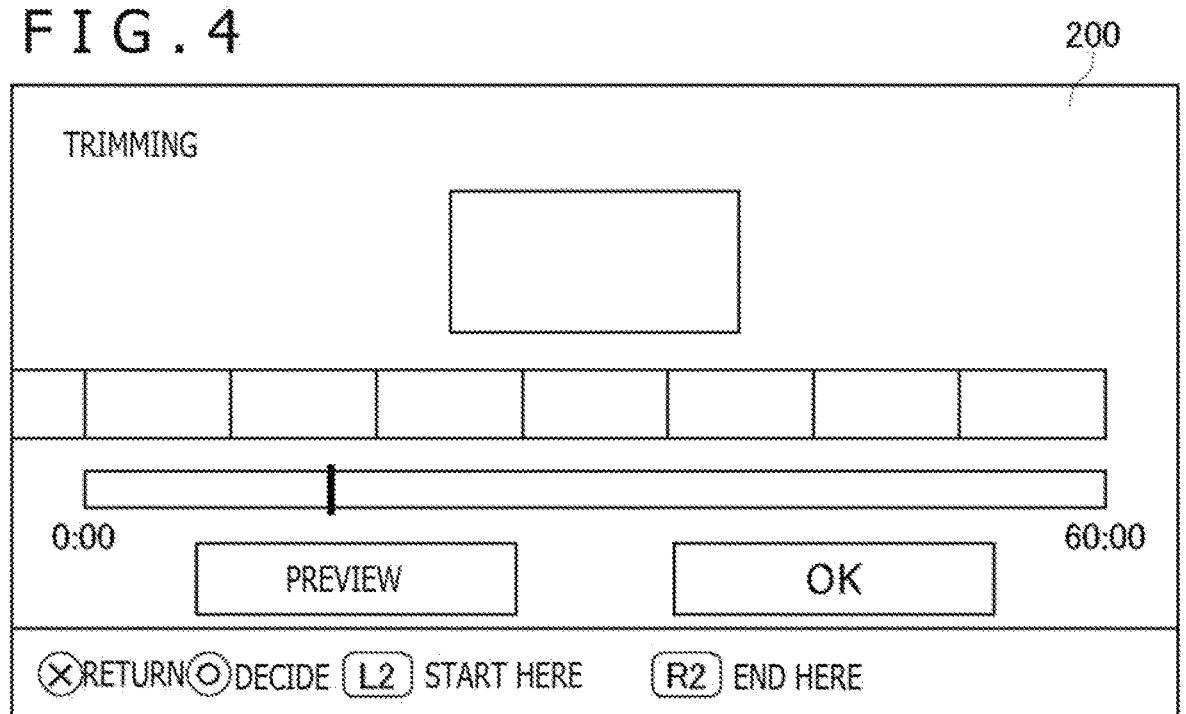
FIG. 4 is a diagram illustrating a trimming edit screen.

FIG. 4 illustrates a trimming edit screen 200. On the trimming edit screen 200, the user can edit the game video saved in the recording apparatus 2a. For example, in a case where a maximum time period for videos that can be uploaded to the distribution server 12 is set, the user may operate the input apparatus 6 to specify the start point and the end point for trimming the game video, and cut the video into a piece which can be uploaded. When the receiving section 138 accepts designation of the start point and the end point from the user, the trimming processing section 140 cuts out the game video recorded in the recording apparatus 2a, at the time positions of the start point and the end point, executes overwriting, and saves the video in the recording apparatus 2a. At this time, the image ID is not changed. Incidentally, regardless of uploading, the user may edit the game video to cut out a favorite play scene.

As described above, the user can save the edited game video in the recording apparatus 2a. The user can upload the game video saved in the recording apparatus 2a to the distribution server 12 and share the game video with other viewing users.

Figure 5:
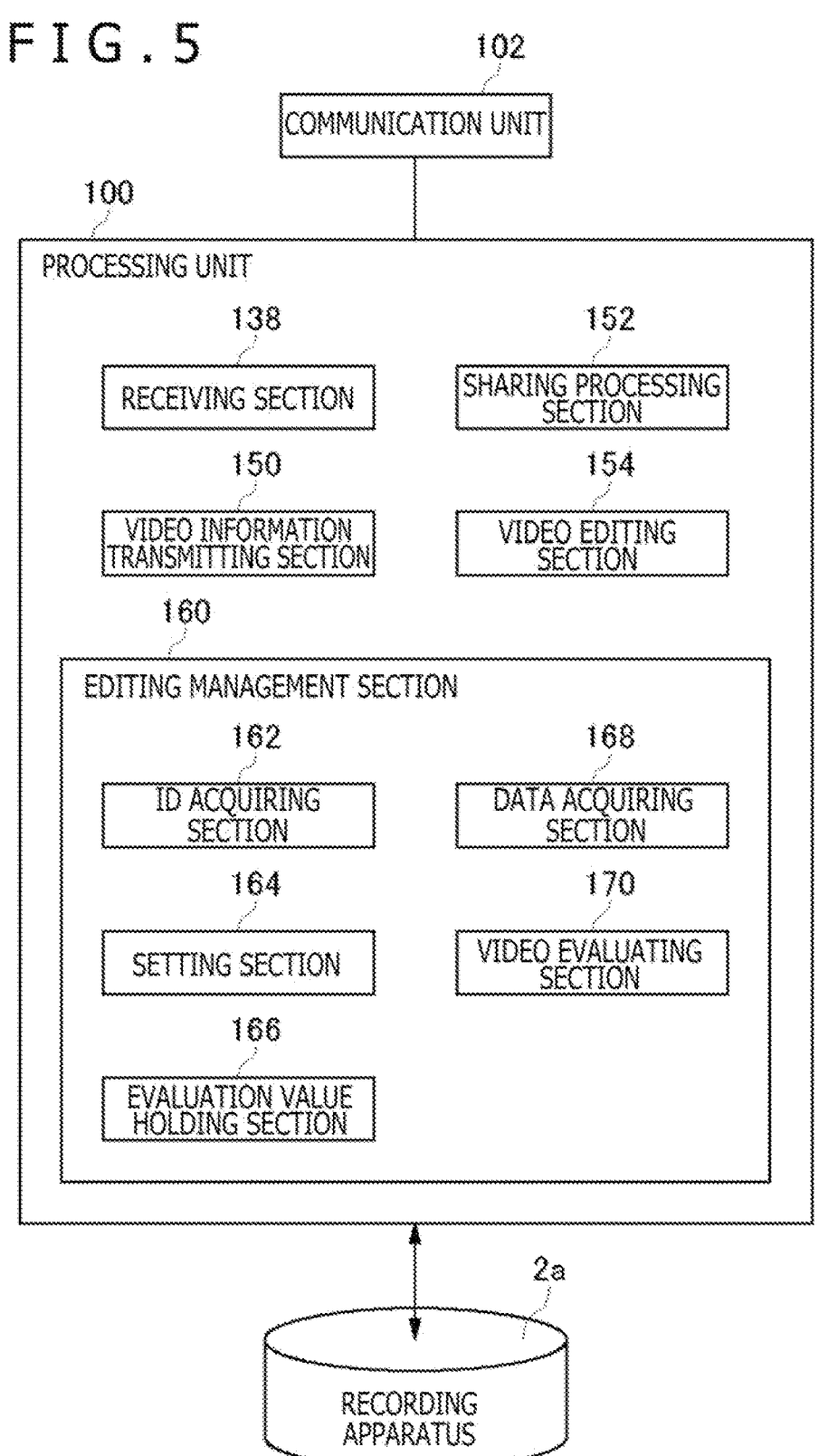
FIG. 5 is a diagram illustrating functional blocks of the information processing apparatus.

FIG. 5 illustrates functional blocks that mainly implement a game video automatic editing function of the information processing apparatus 10. The information processing apparatus 10 includes the processing unit 100 and the communication unit 102. The processing unit 100 includes the receiving section 138, a video information transmitting section 150, a sharing processing section 152, a video editing section 154, and an editing management section 160. The editing management section 160 has an ID acquiring section 162, a setting section 164, an evaluation value holding section 166, a data acquiring section 168, and a video evaluating section 170. The receiving section 138 receives information regarding an operation on the input apparatus 6 from the user. In the information processing system 1, information related to the game video (metadata of the game video) saved in the recording apparatus 2a is transmitted to the metadata server 18 as a precondition for automatically editing the game video saved in the recording apparatus 2a.

FIG. 6 is a sequence diagram of processing for transmitting the metadata of the game video to the metadata server 18. As described above, the video acquiring section 136 saves, in the recording apparatus 2a, the game video (video clip) recorded in the ring buffer 134, on the basis of the operation information input to the input apparatus 6 (S10). When saving the game video in the recording apparatus 2a, the video acquiring section 136 sets an image ID for identifying the game video and time information indicating the start time and the end time of the game video (S12). The start time and the end time may be time stamps generated as absolute time such as UTC (Coordinated Universal Time) or GMT (Greenwich Mean Time). When the game video is saved in the recording apparatus 2a, the video information transmitting section 150 transmits, to the metadata server 18, the image ID set for the game video in the recording apparatus 2a and the time information indicating the start time and the end time of the game video (S14).

Figure 7:
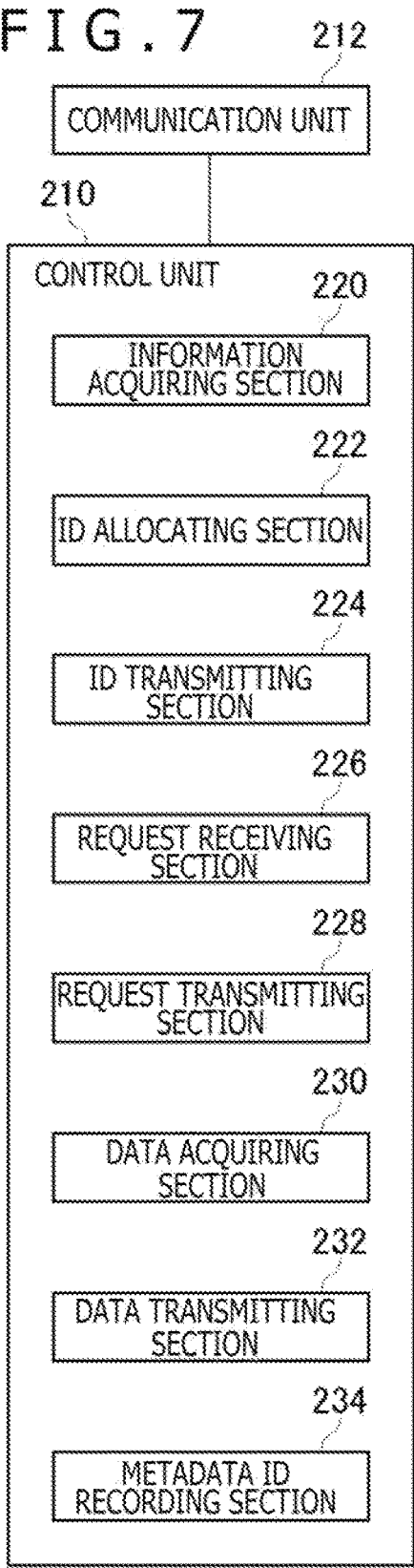
FIG. 7 is a diagram illustrating functional blocks of a metadata server.

FIG. 7 illustrates functional blocks of the metadata server 18. The metadata server 18 has a control unit 210 and a communication unit 212. The control unit 210 has an information acquiring section 220, an ID allocating section 222, an ID transmitting section 224, a request receiving section 226, a request transmitting section 228, a data acquiring section 230, a data transmitting section 232, and a metadata ID recording section 234.

The elements described as the functional blocks for performing various processes of the metadata server 18 in FIG. 7 can include circuit blocks, memories, and other LSI circuits in terms of hardware, and the elements are achieved by a program or the like loaded into a memory in terms of software. Therefore, those skilled in the art will understand that these functional blocks can be achieved in various forms by hardware only, software only, or a combination thereof, and are not limited to either one.

In the metadata server 18, the information acquiring section 220 acquires, from the information processing apparatus 10, the image ID of the game video recorded in the information processing apparatus 10 and the time information indicating the start time and the end time of the game video (S16). The ID allocating section 222 allocates a metadata ID to a combination of the image ID and the time information, and records metadata ID in the metadata ID recording section 234 (S18). The ID transmitting section 224 transmits the allocated metadata ID to the information processing apparatus 10 (S20).

In the information processing apparatus 10, when acquiring the metadata ID from the metadata server 18 (S22), the ID acquiring section 162 records the image ID transmitted to the metadata server 18 and the metadata ID transmitted from the metadata server 18 in the recording apparatus 2a in association with each other (S24).

Note that the user can manually edit the game video saved in the recording apparatus 2a. When the start point and/or the end point of the game video is changed by the user's editing operation, the trimming processing section 140 executes overwriting, saves the edited game video in the recording apparatus 2a (S10), and updates the time information indicating the start time and/or the end time according to the changed game video (S12). At this time, the video information transmitting section 150 transmits the image ID and the updated time information to the metadata server 18 (S14), and the metadata server 18 updates the time information associated with the image ID (S16). In the metadata ID recording section 234, the metadata ID is not changed for the updated combination of the image ID and the time information.

The process of transmitting the game video metadata (the image ID and the video time information) may be performed each time the game video is saved in the recording apparatus 2a, or may be performed periodically. For example, at a predetermined time of a day, unsent game video metadata may be collectively sent to the metadata server 18.

The information processing apparatus 10 according to the embodiment has a function of editing a plurality of game videos accumulated in the auxiliary storage apparatus 2 and presenting the edited videos to the user at a predetermined timing. The information processing apparatus 10 may extract highlight scenes that arouse the user's interest from each of a plurality of game videos, to create a highlight video by joining the highlight scenes.

FIG. 8 illustrates a screen example for setting a creation period of the highlight video. The user specifies the creation period of the highlight video. For example, if "ONE MONTH" is selected, a highlight video is created every month on the basis of game videos which have been recorded in the recording apparatus 2a during one month period. In the example illustrated in FIG. 8, the user selects "ONE MONTH," and the setting section 164 sets the highlight video creation period to "ONE MONTH."

FIG. 9 illustrates an example of a screen for registering a user's favorite scene or status. On this screen, the user registers scenes or statuses which the user desires to preferentially incorporate in the highlight video. The items selected by the user are used as matters of high priority at the time of extracting highlight scenes. Here, "TROPHY ACQUISITION," "BOSS DEFEAT," "HIGH RANKING WINNING," "ENDING," and "NUMBER OF LIKES" are selected, and if there is a selected item in the metadata of the game video provided from the management server 14, the possibility that the scene of the game video will be included in the highlight video increases.

Figure 10:
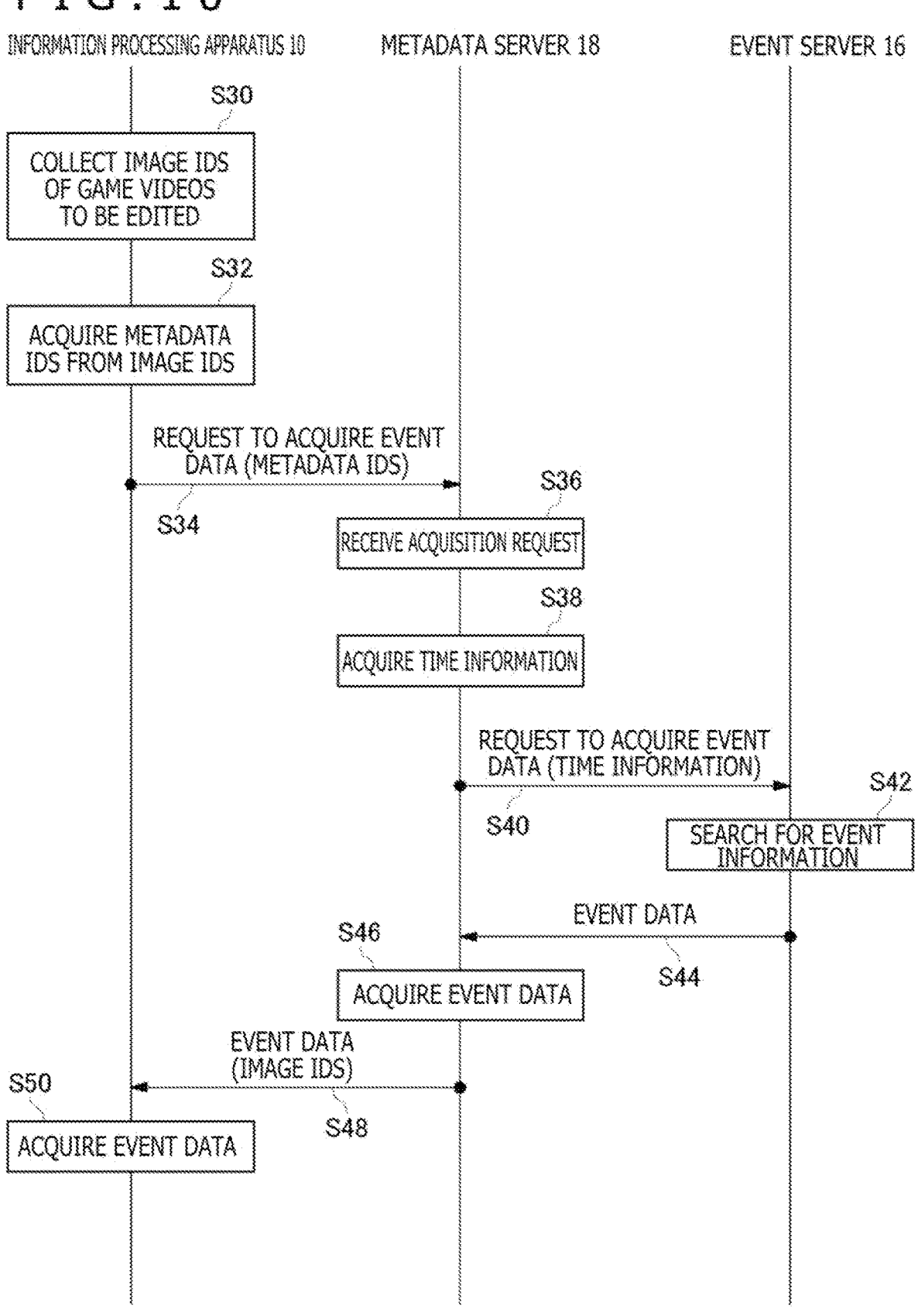
FIG. 10 is a sequence diagram of part of video editing processing.

FIG. 10 is a sequence diagram of part of the video editing processing. Here, a case where the information processing apparatus 10 creates a highlight video every month will be described. When one month has passed since the creation of the last highlight video, the data acquiring section 168 identifies the image IDs of a plurality of game videos saved in the recording apparatus 2a during the last one month period (S30), and acquires the metadata IDs associated with the identified image IDs from the recording apparatus 2a

(S32). The data acquiring section 168 transmits, to the metadata server 18, a request to acquire event data, the request including the plurality of acquired metadata IDs (S34). Incidentally, the acquisition request includes the user's account ID.

In the metadata server 18, a request receiving section 226 receives the event data acquisition request including the metadata IDs from the information processing apparatus 10 (S36). Metadata IDs allocated to image IDs and time information are recorded in the metadata ID recording section 234. The request transmitting section 228 acquires the time information from the metadata ID recording section 234 on the basis of the metadata IDs included in the acquisition request (S38). To be specific, the request transmitting section 228 searches the metadata ID recording section 234 for the metadata IDs included in the acquisition request, and extracts the time information associated with the metadata IDs from the metadata ID recording section 234. As described above, the time information includes the start time and the end time of the game video. The request transmitting section 228 transmits a request to acquire event data, the request including time information, to the event server 16 (S40). The acquisition request includes the user's account ID.

When acquiring the event data acquisition request, the event server 16 searches for event information within the time range determined by the time information included in the acquisition request, among pieces of the event information accumulated in association with the user's account ID (S42). For example, in a case where one piece of time information included in the acquisition request indicates that the start time is 20:30:00 and the end time is 20:35:45 on Jun. 30, 2020, the event server 16 searches for event information that includes time information (time stamp) within the range of 20:30:00 to 20:35:45 on Jun. 30, 2020 among pieces of event information accumulated in association with the account ID. If the acquisition request contains a plurality of pieces of time information, the event server 16 retrieves event information for each piece of time information.

The event server 16 extracts event information having a time stamp within the time range defined by the time information (the start time and the end time of the game video) included in the acquisition request, and transmits the event data to the metadata server 18 (S44). Here, the event data may be the same as the extracted event information, but may be data in which part or all of the game data included in the event information is omitted, for example.

In the metadata server 18, the data acquiring section 230 acquires the event data transmitted from the event server 16 (S46), and the data transmitting section 232 transmits the event data to the information processing apparatus 10 in association with the image IDs (S48).

In the information processing apparatus 10, the data acquiring section 168 acquires event data associated with the image IDs (S50). At this time, the data acquiring section 168 acquires event data associated with each of the plurality of image IDs, and supplies the acquired event data to the video evaluating section 170. The video evaluating section 170 calculates an evaluation value by using the event data of the game video, and determines a scene to be edited.

Incidentally, in the information processing system 1, the user can upload, to the distribution server 12, the game video recorded in the recording apparatus 2a. If there is a game video which has been uploaded to the distribution server 12, among game videos recorded during one month period to be edited, the sharing processing section 152 may acquire distribution result data of the game videos from the distribution server 12 to supply the distribution result data to the video evaluating section 170. The distribution result data may include the total number of distributions, the number of distributions in the last week, the number of "likes" by viewing users, and the like. The video evaluating section 170 may calculate an evaluation value by using the distribution result data of the game video uploaded to the distribution server 12 and determine the scene to be edited.

FIG. 11 illustrates an example of an evaluation value table held by the evaluation value holding section 166. The evaluation value table includes evaluation values allocated to items such as events and distribution results. The video evaluating section 170 calculates the sum of the evaluation values of the event scenes in the game videos on the basis of the event data and/or the distribution result data of the game videos by referring to the evaluation value table. It means that an event scene with a high total evaluation value is likely to interest the user and, on the other hand, an event scene with a low total evaluation value is unlikely to interest the user.

The video evaluating section 170 determines event scenes to be edited, according to the following procedure.
(1) The video evaluating section 170 refers to event data for each game video and extracts an event scene including a time at which an event has occurred. For example, a total of two minutes of event scenes including each one minute before and after the occurrence of the event may be extracted.
(2) The video evaluating section 170 calculates the evaluation value of each event scene, and identifies event scenes with evaluation values higher than a predetermined threshold.

For example, it is assumed that the following boss defeating event has occurred during the two-minute event scene, resulting in trophy acquisition, and the following distribution result data has been associated with the game video.
Event
Defeat the final boss
Trophy
Win a gold trophy
Number of Times of Distribution
150,000 times
Note that this event scene lasts for a total of two minutes, including one minute before defeating the final boss and one minute after the defeating.

At this time, as illustrated in FIG. 9, it is assumed that the user selects "TROPHY WINNING," "BOSS DEFEAT," "HIGH RANKING WINNING," "ENDING," and "NUMBER OF LIKES" as priority items of the highlight scene. The video evaluating section 170 performs a process of adding 20 points of evaluation values to the selected priority item.

With Reference to FIG. 11, evaluation values for each element of the event scene are as follows.
Defeat the Final Boss
70 points+20 points (additional points)
Win a Gold Trophy
60 points+20 points (additional points)
150,000 Times of Distribution
20 points
As described above, the video evaluating section 170 calculates the total evaluation value of the event scene, and the value is 190 points in this example.

The video evaluating section 170 compares the calculated evaluation values of the event scene with a predetermined threshold, and determines to incorporate an event scene

13 | 14 whose value is higher than the predetermined threshold into the highlight video. For example, in a case where the predetermined threshold is 200 points, an event scene with evaluation values of 190 points is not included in the highlight video.

The video evaluating section 170 calculates evaluation values for all event scenes, and determines an event scene whose threshold exceeds a predetermined threshold, thereby providing information regarding the event scene to the video editing section 154. The video editing section 154 performs editing processing on a plurality of game videos on the basis of the event scenes determined by the video evaluating section 170. To be specific, the video editing section 154 creates a highlight video by joining a plurality of event scenes together. At this time, the video editing section 154 may limit the time span of the highlight video by setting an upper limit on the number of event scenes to be joined together. Also, in a case where there are many event scenes having evaluation values exceeding a predetermined threshold, the video editing section 154 may create a plurality of highlight videos.

The present disclosure has been described above based on the embodiment. It should be understood by those skilled in the art that this embodiment is an example, that various modifications can be made to combinations of the components and the handling processes, and that such modifications are also within the scope of the present disclosure.

INDUSTRIAL APPLICABILITY

The present disclosure can be used in the technical field of editing game videos.

REFERENCE SIGNS LIST

1: Information processing system
2a: Recording apparatus
10: Information processing apparatus
12a, 12b: Distribution server
14: Management server
16: Event server
18: Metadata server
100: Processing unit
102: Communication unit
110: Game software
120: Event information generating section
122: Event information transmitting section
124: Trophy processing section
130: Output processing section
132: Recording control section
134: Ring buffer
136: Video acquiring section
138: Receiving section
140: Trimming processing section
150: Video information transmitting section
152: Sharing processing section
154: Video editing section
160: Editing management section
162: ID acquiring section
164: Setting section
166: Evaluation value holding section
168: Data acquiring section
170: Video evaluating section
200: Trimming edit screen
210: Control unit
212: Communication unit
220: Information acquiring section

222: ID allocating section
224: ID transmitting section
226: Request receiving section
228: Request transmitting section
230: Data acquiring section
232: Data transmitting section
234: Metadata ID recording section

The invention claimed is:

1. An information processing apparatus comprising: one or more processors configured to:

access image data and sound data from a memory;

generate at least one game video based on the image data and the sound data;

transmit, to a management server, a combination of an image identifier (ID), a start time and an end time of the at least one game video;

acquire, from the management server, a metadata ID allocated to the combination of the image ID, the start time and the end time of the at least one game video;

generate, upon an occurrence of an event during a game, an event code allocated to the event;

add game data indicating a state of the game to the event code;

transmit, to the management server, the event code and a time of the occurrence of the event;

transmit, to the management server, an event data acquisition request including the metadata ID;

acquire, from the management server, event data comprising one or more event codes, including the event code, and their corresponding one or more times of occurrences, including the time of occurrence, between the start time and the end time of the at least one game video associated with the metadata ID;

automatically determine one or more scenes to be edited based on the event data; and edit the game video to obtain the determined one or more scenes.

2. The information processing apparatus according to claim 1, wherein the one or more processors are configured to record the image ID and the metadata ID in association with each other.

3. The information processing apparatus according to claim 1, wherein the one or more processors are configured to calculate an evaluation value using the event data of the game video and further configured to determine the one or more scenes to be edited based on the evaluation value.

4. The information processing apparatus according to claim 3, wherein the one or more processors are configured to calculate the evaluation value using distribution result data of the game video uploaded to a distribution server.

5. A method for editing a game video, the method comprising:

accessing image data and sound data from a memory;

generating at least one game video based on the image data and the sound data;

transmitting, to a management server, a combination of an image ID, a start time and an end time of the at least one game video;

acquiring, from the management server, a metadata ID allocated to the combination of the image ID, the start time and the end time of the at least one game video;

generating, upon an occurrence of an event during a game, an event code indicative of the event allocated to the event;

adding game data indicating a state of the game to the event code;

transmitting, to the management server, the event code and a time of the occurrence of the event;

transmitting, to the management server, an event data acquisition request including the metadata ID;

acquiring, from the management server, event data comprising one or more event codes, including the event code, and their corresponding one or more times of occurrences, including the time of occurrence, between the start time and the end time of the at least one game video associated with the metadata ID;

automatically determining one or more scenes to be edited, on a basis of the event data; and the game video to obtain the determined one or more scenes.

6. A non-transitory, computer readable storage medium containing a computer program, which when executed by a computer, causes the computer to perform a method by carrying out actions, comprising:

accessing image data and sound data from a memory;

generating at least one game video based on the image data and the sound data;

transmitting, to a management server, a combination of an image ID, a start time and an end time of the at least one game video;

acquiring, from the management server, a metadata ID allocated to the combination of the image ID, the start time and the end time of the at least one game video;

generating, upon an occurrence of an event during a game, an event code allocated to the event;

adding game data indicating a state of the game to the event code;

transmitting, to the management server the event code and a time of the occurrence of the event;

transmitting, to the management server, an event data acquisition request including the metadata ID;

acquiring, from the management server, event data comprising one or more event codes including the event code and their corresponding one or more times of occurrences, including the time of occurrence, between the start time and the end time of the at least one game video associated with the metadata ID;

automatically determining one or more scenes to be edited, on a basis of the event data; and editing the game video to obtain the determined one or more scenes.

7. A metadata server connected to an information processing apparatus operated by a user, the metadata server comprising:

one or more processors configured to:

acquire, from the information processing apparatus, a combination of an image ID a start time and an end time of at least one game video recorded in the information processing apparatus;

allocate a metadata ID to the combination of the image ID, the start time and the end time of the at least one game video;

transmit the metadata ID to the information processing apparatus;

receive, from the information processing apparatus, an event data acquisition request including the metadata ID;

acquire the start time and the end time on a basis of the metadata ID included in the event data acquisition request;

transmit a request to acquire event data to an event server, the request including the start time and the end time;

acquire, from the event server, event data comprising one or more event codes including an event code and their corresponding one or more times of occurrences, including the time of occurrence, between the start time and the end time, the event code being allocated to a corresponding event and being added game data indicating a state of a game; and transmit the event data to the information processing apparatus.

8. The information processing apparatus of claim 1, wherein the one or more processors are further configured to:

identify one or more image IDs of one or more game videos during a creation period;

acquire one or more metadata IDs associated with the identified one or more image IDs; and transmit, to the management server, the event data acquisition request comprising the one or more metadata IDs.

9. The information processing apparatus of claim 8, wherein the one or more processors are further configured to:

present, on a display device, a screen for setting a creation period; and upon a receipt of the creation period, the one or more processors are further configured to create a highlight video every creation period, the highlight video including the one or more scenes.

10. The information processing apparatus of claim 1, wherein the event data acquisition request comprises a user's account ID.

11. The information processing apparatus of claim 1, wherein the one or more processors are configured to present, on a display device, a screen for registering a user's favorite scene or a status.

12. The information processing apparatus of claim 11, wherein the status is associated with an event code.

13. The method of claim 5, further comprising recording the image ID and the metadata ID in association with each other.

14. The method of claim 5, further comprising:

calculating an evaluation value using the event data of the game video; and determining the one or more scenes to be edited based on the evaluation value.

15. The method of claim 14, further comprising:

calculating the evaluation value using distribution result data of the game video uploaded to a distribution server.

16. The method of claim 5, further comprising:

identifying one or more image IDs of one or more game videos recorded during a creation period;

acquiring one or more metadata IDs associated with the identified one or more image IDs; and transmitting, to the management server, the event data acquisition request comprising the one or more metadata IDs.

17. The method of claim 16, further comprising:

presenting a screen for setting a creation period; and upon a receipt of the creation period, creating a highlight video every creation period, the highlight video including the one or more scenes.

18. The metadata server of claim 7, wherein the one or more processors are further configured to:

store one or more metadata IDs and their associated one or more combinations of image ID, start time and end time;

search for the metadata ID included in the event data acquisition request through the stored one or more metadata IDs; and extract stored start time and the end time associated with the searched metadata ID.

19. The metadata server of claim 7, wherein the request further comprises a user's account ID.

\* \* \* \* \*